June 19, 1923.
M. T. CONROY
TIRE
Filed Dec. 2, 1921
1,459,362
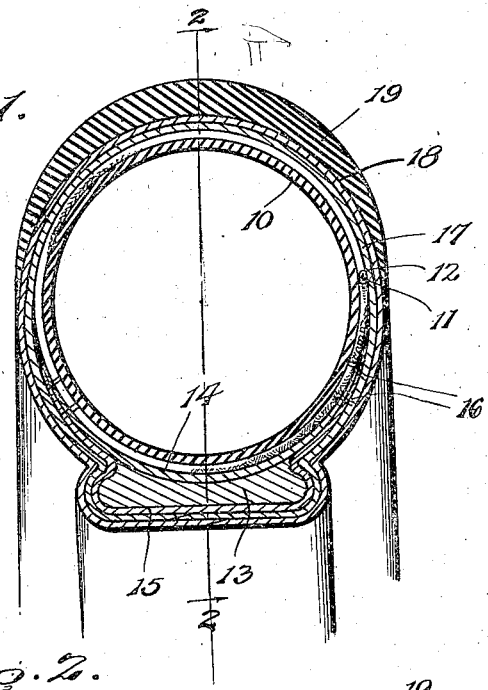
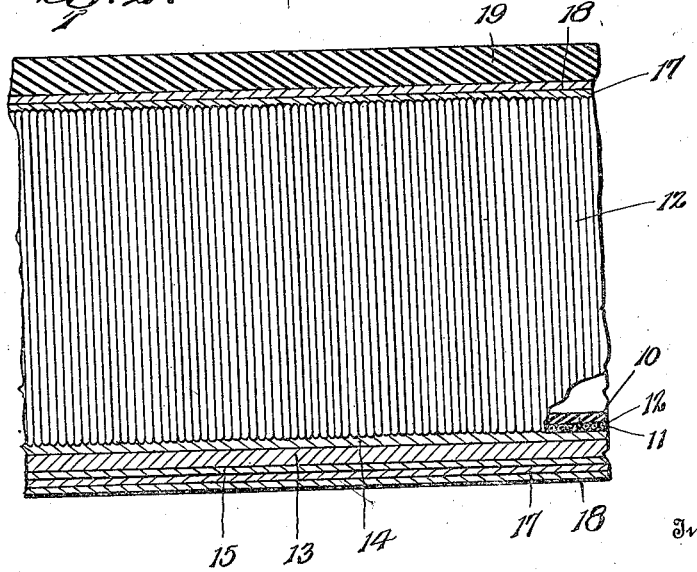
Inventor
M. T. Conroy.
By Lacey & Lacey, Attorneys Patented June 19, 1923.

1,459,362

UNITED STATES PATENT OFFICE.

MICHAEL T. CONROY, OF AKRON, OHIO.

TIRE.

Application filed December 2, 1921. Serial No. 519,499.

*To all whom it may concern:*

Be it known that I, MICHAEL T. CONROY, citizen of the United States, residing at Akron, in the county of Summit and State of Ohio, have invented certain new and useful Improvements in Tires, of which the following is a specification.

This invention relates to an improved pneumatic tire and seeks, as one of its principal objects, to provide a tire embodying a protecting armor reinforcing the tire.

A further object of the invention is to provide a tire wherein the carcass will be built around the inner tube of the tire and wherein said armor will encircle the tube between the tube and carcass.

And the invention has as a still further object to provide a tire wherein the armor will be formed by wrapping the inner tube of the tire with a length of wire to provide a flexible metallic jacket surrounding the tube.

Other and incidental objects will appear hereinafter.

In the drawing:

Figure 1 is a transverse sectional view through my improved tire, and

Figure 2 is a fragmentary longitudinal sectional view on the line 2—2 of Figure 1, the armor employed being shown in elevation.

Referring now more particularly to the drawing, I employ an inner tube 10 and surrounding said tube is a flexible armor. This armor is formed from a length of suitable resilient wire 11 closely wound around the tube so that the convolutions of the wire touch each other and, preferably, the wire carries a rubber impregnated cord cover 12 so that when the tire is cured, in the process of manufacture thereof, the portions of the cover brought into contact by the abutting convolutions of the armor will unite for joining said convolutions and forming the armor into a continuous closed tube surrounding the tube 10.

I further provide a double-edged bead 13. This bead may be either of the straight side or clincher type, the clincher type being shown in the present instance, and upon the bead at its inner side is an annular securing strip 14 while a similar strip 15 is arranged to overlie the bead at its outer side. These strips are preferably formed of fabric and, as will now be noted, the inner face of the bead is concave so that when the tube 10 with its armor 11 is assembled around the bead, the armor will sink in the concavity of the bead overlying the strip 14. The side margins of this strip are arranged to extend upwardly along the sides of the armor 11, while the side margins of the strip 15 are disposed to overlie the margins of the first strip and securing the margins together as well as to the armor, are lines of stitching 16. The bead 13 will thus be securely connected with the armor and in this connection it should be observed that the strips 14 and 15 may be adhesively or otherwise secured to the bead. Surrounding the armor 11 is the initial cord ply 17 of the tire carcass. The margins of this ply are overlapped at the outer face of the bead and overlying the ply 17 is a second cord ply 18, the margins of which are also overlapped at the outer face of the bead. These cord plies will thus enclose the bead while also serving, auxiliary to the strips 14 and 15, to firmly secure the bead in position and, of course, any feasible number of cord plies similar to the plies 17 and 18, may be employed. Encircling the cord ply 18 at the crown of the tire is the tread 19.

In practice, the tube 10 is, before the ends thereof are spliced, arranged upon a mandrel when the wire 11 is wrapped around the tube to closely approach the ends thereof. The ends of the tube are then spliced in the usual manner when the wire is wrapped over the splice and connected at its ends to complete the armor. The armor is then coated with a film of rubber when the tube with its armor thereon is arranged upon the bead 13. The cord plies 17 and 18 of the carcass are then applied, the film of rubber coacting the armor serving to connect the ply 17 with the armor. Finally, the tread 19 is applied when the completed tire is cured in any approved manner.

As will be seen in view of the foregoing, the armor will serve to protect the inner tube 10 against puncture and will also reinforce the walls of the tire and since the convolutions forming said armor are united, wear of the inner tube such as would be set up by a pinching action of the several convolutions, will be eliminated. Furthermore, the convolutions will be held against spreading so that bunching of the convolutions of the armor in the practical use of the tire will also be overcome. I accordingly provide a tire which will be extremely durable while, at the same time, the tire will possess all the functional qualities of an ordinary pneumatic tire. The inner tube carries a valve, of course, whereby the tire may be inflated but since the construction and mounting of this valve forms no part of the present invention, it has not been shown. The cord covered wire, as illustrated and described herein, may, while being particularly adapted for use in tires, nevertheless be advantageously employed in various other connections such, for instance, as in fire hose, air hose, garden hose and air bags.

Having thus described the invention, what is claimed as new is:

In a tire, the combination of a double edged bead, a tube encircling the bead, a fabric strip interposed between the bead and tube and having feathered side margins terminating at the sides of the tube, a second fabric strip enclosing the bead in contact therewith and having feathered side margins overlying the side margins of said first mentioned strip terminating coincident therewith, lines of stitching uniting the margins of said strips, a cord ply surrounding the tube and bead and having its margins overlapped against the latter strip at the inner circumference of the bead, and a tread encircling said ply.

In testimony whereof I affix my signature.

MICHAEL T. CONROY. [L. .s.]